(12) United States Patent
Kouki et al.

(10) Patent No.: US 8,364,092 B2
(45) Date of Patent: Jan. 29, 2013

(54) BALANCED ACTIVE AND PASSIVE DUPLEXERS

(75) Inventors: Ammar B. Kouki, Montréal (CA); Christian Talbot, Montréal (CA)

(73) Assignee: Ecole de Technologie Superieure, Montreal, Quebec (CA)

( * ) Notice: Subject to any disclaimer, the term of this patent is extended or adjusted under 35 U.S.C. 154(b) by 815 days.

(21) Appl. No.: 11/403,189

(22) Filed: Apr. 13, 2006

(65) Prior Publication Data

US 2007/0015468 A1    Jan. 18, 2007

Related U.S. Application Data

(60) Provisional application No. 60/671,100, filed on Apr. 14, 2005.

(51) Int. Cl.
*H04B 1/46* (2006.01)

(52) U.S. Cl. ............ 455/80; 455/63.1; 455/78; 455/73

(58) Field of Classification Search .................. 455/78, 455/73, 83
See application file for complete search history.

(56) References Cited

U.S. PATENT DOCUMENTS

| | | | | |
|---|---|---|---|---|
| 3,093,826 A | * | 6/1963 | Fink | 342/368 |
| 3,945,009 A | * | 3/1976 | Trigon | 342/161 |
| 4,107,678 A | * | 8/1978 | Powell | 342/62 |
| 4,766,437 A | * | 8/1988 | Schmidt et al. | 342/368 |
| 5,148,117 A | | 9/1992 | Talwar | |
| 5,444,864 A | | 8/1995 | Smith | |
| 5,574,978 A | | 11/1996 | Talwar et al. | |
| 5,729,829 A | | 3/1998 | Talwar et al. | |
| 6,507,728 B1 | * | 1/2003 | Watanabe et al. | 455/78 |
| 6,567,649 B2 | | 5/2003 | Souissi | |
| 6,745,018 B1 | | 6/2004 | Zehavi et al. | |
| 2002/0072344 A1 | * | 6/2002 | Souissi | 455/296 |
| 2003/0174763 A1 | * | 9/2003 | Kouki | 375/219 |
| 2004/0151238 A1 | * | 8/2004 | Masenten | 375/219 |
| 2004/0166802 A1 | * | 8/2004 | McKay et al. | 455/15 |
| 2004/0190479 A1 | * | 9/2004 | Deane et al. | 370/339 |
| 2006/0019611 A1 | * | 1/2006 | Mages | 455/73 |
| 2008/0272959 A1 | * | 11/2008 | Meharry et al. | 342/174 |

FOREIGN PATENT DOCUMENTS

| | | |
|---|---|---|
| WO | WO2004073208 | 8/2004 |
| WO | WO2004095763 | 11/2004 |

OTHER PUBLICATIONS

O'Sullivan, T. and Asbeck, P.: "Adaptive Noise Cancellation for IS95 Transmitters", University of California, San Diego. IEEE Topical Workshop on Power Amplifiers for Wireless Communications 2003, http://paworkshop.ucsd.edu/papers2003/OSullivanPaworkshop2003.ppt.

* cited by examiner

*Primary Examiner* — Nay A. Maung
*Assistant Examiner* — Erica Fleming-Hall
(74) *Attorney, Agent, or Firm* — Norton Rose Canada LLP (57) ABSTRACT

An active cancellation unit is disclosed for improving the noise cancellation between a transmitter and a receiver which are connected to an antenna using a duplexer, the unit comprising a coupler sampling a signal to transmit provided by the transmitter, a cancellation duplexer having characteristics similar to the duplexer and receiving the sampled signal to provide a simulated signal and an active component receiving the simulated signal and providing an amplified signal having a phase 180 degree shifted with respect to the simulated signal; and a coupler for injecting the simulated signal at the receiver.

9 Claims, 13 Drawing Sheets

BALANCED ACTIVE AND PASSIVE DUPLEXERS

CROSS-REFERENCE AND RELATED APPLICATIONS

This patent application claims priority of U.S. Provisional Patent Application No. 60/671,100 entitled "Balanced Active and Passive Duplexers" that was filed Apr. 14, 2005, the specification of which is hereby incorporated by reference.

FIELD OF THE INVENTION

The invention relates to telecommunications. In particular, the invention pertains to an active balanced duplexer.

BACKGROUND OF THE ART

Figure 1:
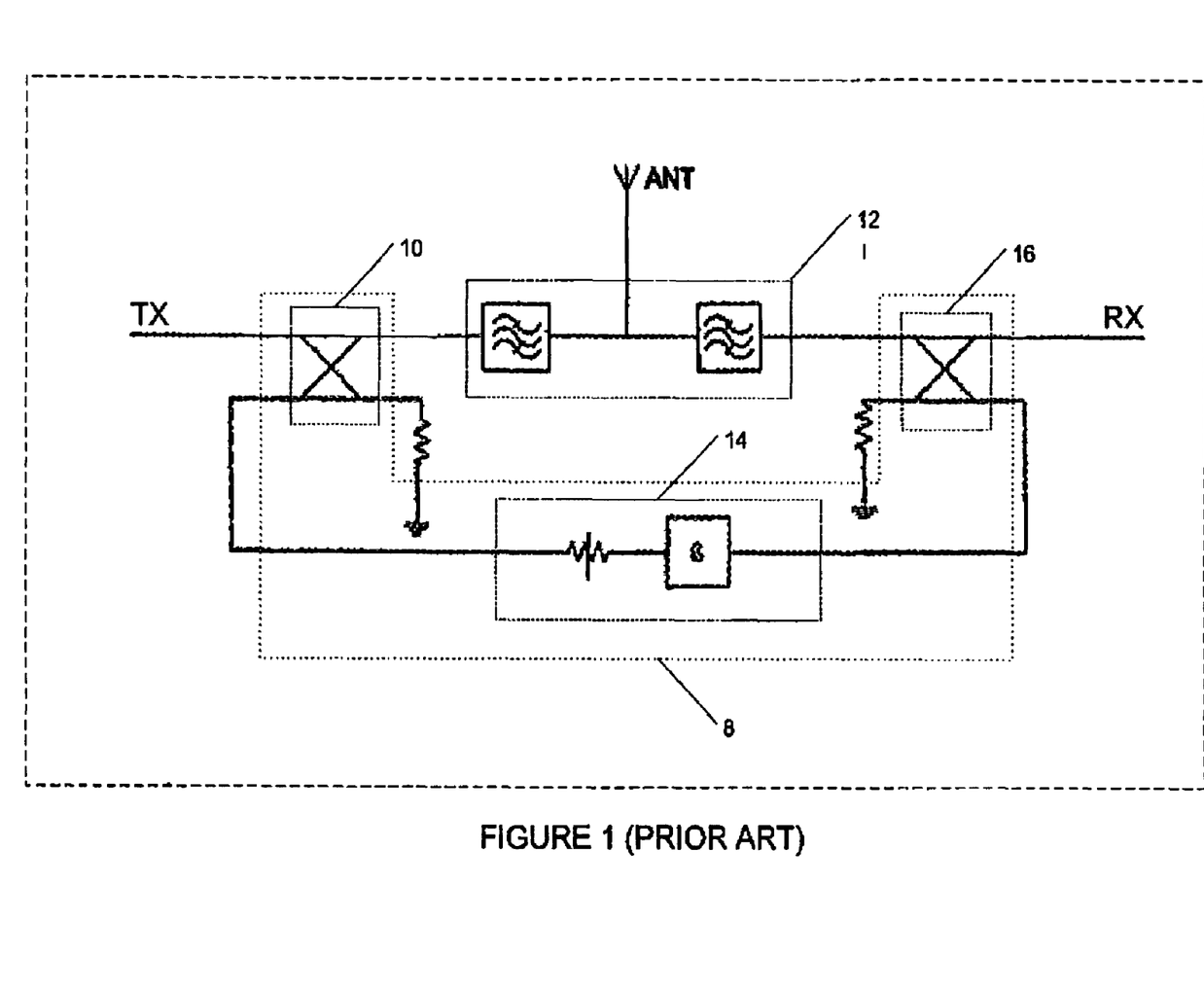
FIG. 1 is an electrical schematic which shows a first prior art embodiment of a signal cancellation loop added to a filter-based duplexer to improve TX-RX isolation.

FIG. 1 shows a prior art active signal cancellation loop 8 added to a filter-based duplexer 12 to improve isolation between a transmitter TX and a receiver RX. More precisely, the cancellation loop 8 comprises a first coupler 10, a unit 14 comprising a variable attenuator and a phase shifter, and a second coupler 16.

The first coupler 10 samples a signal generated by the transmitter TX. The variable attenuator controls the amplitude of the sampled signal generated to provide a signal which is then shifted in phase using the phase shifter. The resulting signal shifted in phase is then injected at the receiver using the second coupler 16. The skilled addressee will appreciate that as the phase is shifted by 180 degrees, the second coupler 16 acts as a subtraction unit which removes a signal leaking from the transmitter TX to the receiver RX.

The skilled addressee will appreciate that in order to cancel the signal leaking from the transmitter TX to the receiver RX, it is necessary that the resulting signal shifted in phase and injected by the second coupler 16 has an amplitude equal to the amplitude of the signal leaking and a phase shifted by 180 degrees. Unfortunately, the skilled addressee will appreciate that such condition is only achieved for a given frequency with the apparatus disclosed in FIG. 1. This topology is therefore inherently narrow band and is highly sensitive to the phase response of the duplexer path. The phase response is particularly problematic in the case of SAW filters. Therefore, if the topology of FIG. 1 is used, the transmitter TX receiver RX isolation is expected to be improved over a very narrow band. Such improvement may be significant but would have to be adjusted dynamically through the control of the variable attenuator and the phase shifter by the cell phone to place the cancellation null at the user's exact frequency in the case where the transmitter and the receiver are embedded in a cell phone. Such type of improvement has already been demonstrated with other filters and is reproduced here using a commercial duplexer (part number 856356 from SawTek). It has also been contemplated that if the antenna to which the transmitter and the receiver are connected is not well adapted, the cancellation loop 8 has only a limited effect on the signal leaking from the transmitter to the receiver.

The results are shown in FIGS. 9a, 9b, 10a and 10b. As illustrated, FIGS. 9a, 9b, 10a and 10b show that a high level of isolation may be achieved over a narrow bandwidth, which is typically around 1-2 MHz. It will be appreciated that this cancellation may be tuned to the desired frequency by adjusting mainly the phase shifter. While this topology is simple, the access to active tuning and the adaptive control of the tuning require the interface to the digital processing power of the receiver.

Figure 2:
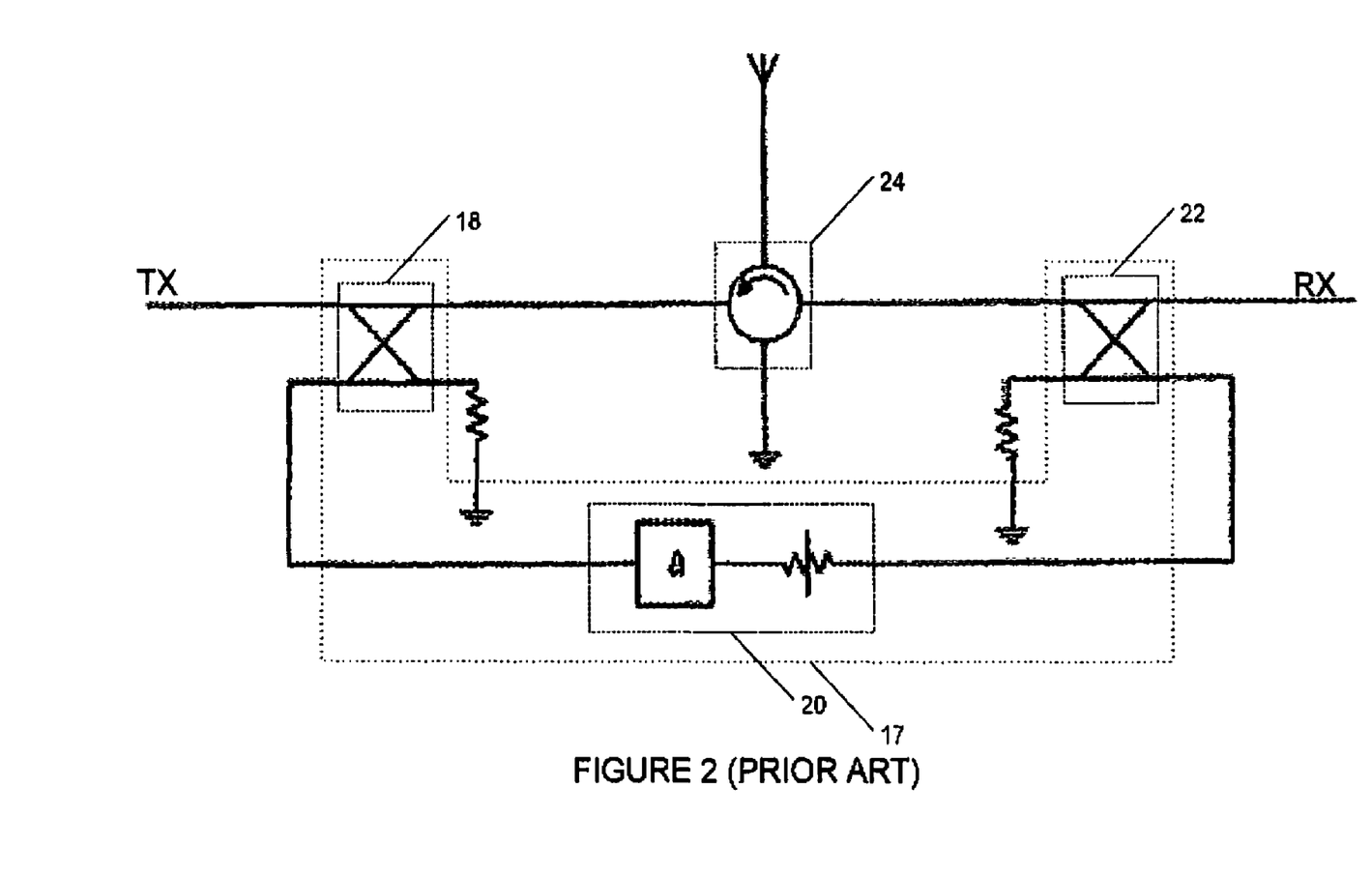
FIG. 2 is an electrical schematic which shows a second prior art embodiment of a signal cancellation loop added to a circulator-based duplexer to improve TX-RX isolation.

Referring to FIG. 2, there is shown another embodiment of a prior art active signal cancellation loop 17 added to a circulator-based duplexer 24 to improve isolation between a transmitter TX and a receiver RX. More precisely, the cancellation loop 17 comprises a first coupler 18, a unit 17 comprising a variable attenuator and a phase shifter, and a second coupler 22.

The first coupler 18 samples a signal generated by the transmitter TX. The variable attenuator controls the amplitude of the sampled signal generated to provide a signal which is shifted in phase using the phase shifter. The resulting signal shifted in phase is injected at the receiver using the second coupler 22. The skilled addressee will appreciate that as the phase is shifted by 180 degrees, the second coupler 22 acts as a subtraction unit which removes a signal leaking from the transmitter TX to the receiver RX. The skilled addressee will appreciate that the circulator-based duplexer 24 provides a less important transmitter receiver isolation which therefore cause a greater signal leaking. The cancellation loop 17 therefore brings an improvement while still suffering from the same drawbacks outlined in the embodiment disclosed in FIG. 1.

There is a need for a method and apparatus that will overcome at least one of the above-identified drawbacks.

Features of the invention will be apparent from review of the disclosure, drawings and description of the invention below.

DISCLOSURE OF THE INVENTION

According to a first aspect of the invention, there is provided an active cancellation unit for improving the noise cancellation between a transmitter and a receiver which are connected to an antenna using a duplexer, the unit comprising a coupler sampling a signal to transmit provided by the transmitter, a cancellation duplexer having characteristics similar to the duplexer and receiving the sampled signal to provide a simulated signal, an active component receiving the simulated signal and providing an amplified signal having a phase 180 degree shifted with respect to the simulated signal and a coupler for injecting said simulated signal at the receiver.

According to a second aspect of the invention, there is provided a new architecture for purely passive signal splitting and combining for improving the noise cancellation between a transmitter and a receiver, the unit comprising a 90° hybrid coupler to equally divide the transmit signal, the divided transmit signal is fed to two duplexers having similar characteristics, the divided transmit signals emerging from the antenna ports of the two duplexers are summed through a 90° hybrid coupler reconstructing the original transmit signal and fed to the antenna, the divided transmit signals leaking through the two duplexers to the receiver are subtracted through a 90° hybrid coupler canceling the said leaking signal at the receiver.

According to a further aspect of the invention, there is provided a balanced passive duplexer

DESCRIPTION OF TEE DRAWINGS

In order that the invention may be readily understood, embodiments of the invention are illustrated by way of example in the accompanying drawings.

Further details of the invention and its advantages will be apparent from the detailed description included below.

DETAILED DESCRIPTION OF PREFERRED EMBODIMENTS

In the following description of the embodiments, references to the accompanying drawings are by way of illustration of an example by which the invention may be practiced. It will be understood that other embodiments may be made without departing from the scope of the invention disclosed.

In order to combat the narrow band nature of the cancellation obtained with the prior art configurations shown in FIG. 1 and FIG. 2, new balanced topologies are proposed.

Figure 3:
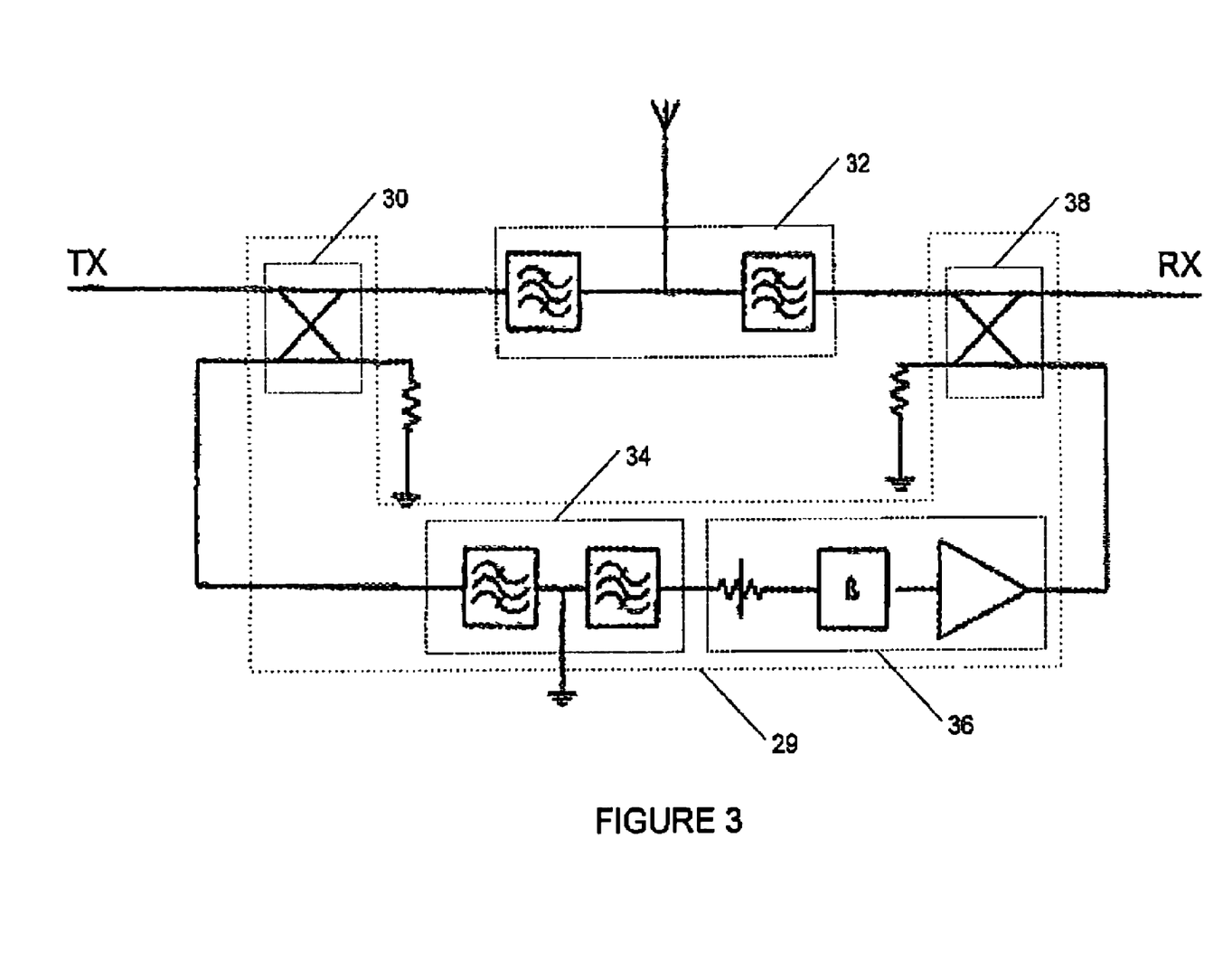
FIG. 3 is an electrical schematic which shows a signal cancellation loop added to a filter-based duplexer to improve TX-RX isolation according to a first embodiment of the invention.

Referring to FIG. 3, there is shown a first embodiment of a cancellation loop 29.

The cancellation loop 29 comprises a first coupler 30, a filter-based duplexer 34, an active component 36 and a second coupler 38.

The active component 36 comprises a variable attenuator, a variable phase shifter and an amplifier.

In this embodiment, the same filter-based duplexer is used in both branches. It will be appreciated that while not exactly identical, the two filter-based duplexers should preferably have comparable phase responses in order to make the cancellation loops more wideband. It will be appreciated that the use of the filter-based duplexer 34 in the cancellation loop 29 implies that an amplifier is preferably required to compensate for all losses in the cancellation loop 29.

It will be appreciated that such amplifier should have a low P1 dB (i.e. Output power at 1 dB gain compression). For the configuration used in the tests, the amplifier gain is set to 30 dB and the required P1 dB is less than 0 dBm.

It will be noted that if an all pass saw filter could be designed that would produce the same phase response as the filter-based duplexer, the cancellation bandwidth could be increased without the need for an amplifier in the cancellation loop 29.

FIG. 3 shows the topology of the balanced cancellation loop 29 using the filter-based duplexer 34. A prototype based on this topology was assembled. The prototype was fully characterized and the results in each case are compared to those of the duplexer-only. These results are shown in FIGS. 11a, 11b, 12a and 12b. The skilled addressee will appreciate that these results show an improved isolation over a much larger bandwidth at a cost of a slight increase in insertion loss.

It will be appreciated that the performance improvements obtained have still been limited by the fact that the filter-based duplexers are not identical and that the design is in MIC technology. Removing these limitations may further enable a greater performance improvement. Furthermore, no effort was made to compensate the additional delay due to the amplifier. In light of these results, a controlled SAW/MMIC, MMIC only or MHMIC-only design should certainly yield a filter-based duplexer with substantially improved isolation. The insertion losses will increase but this may be minimized by proper choice and design of the couplers 30 and 38. The skilled addressee will appreciate that the topology disclosed in FIG. 3 is referred to as a "balanced" cancellation loop as the cancellation loop 29 comprises a duplexer.

Figure 4:
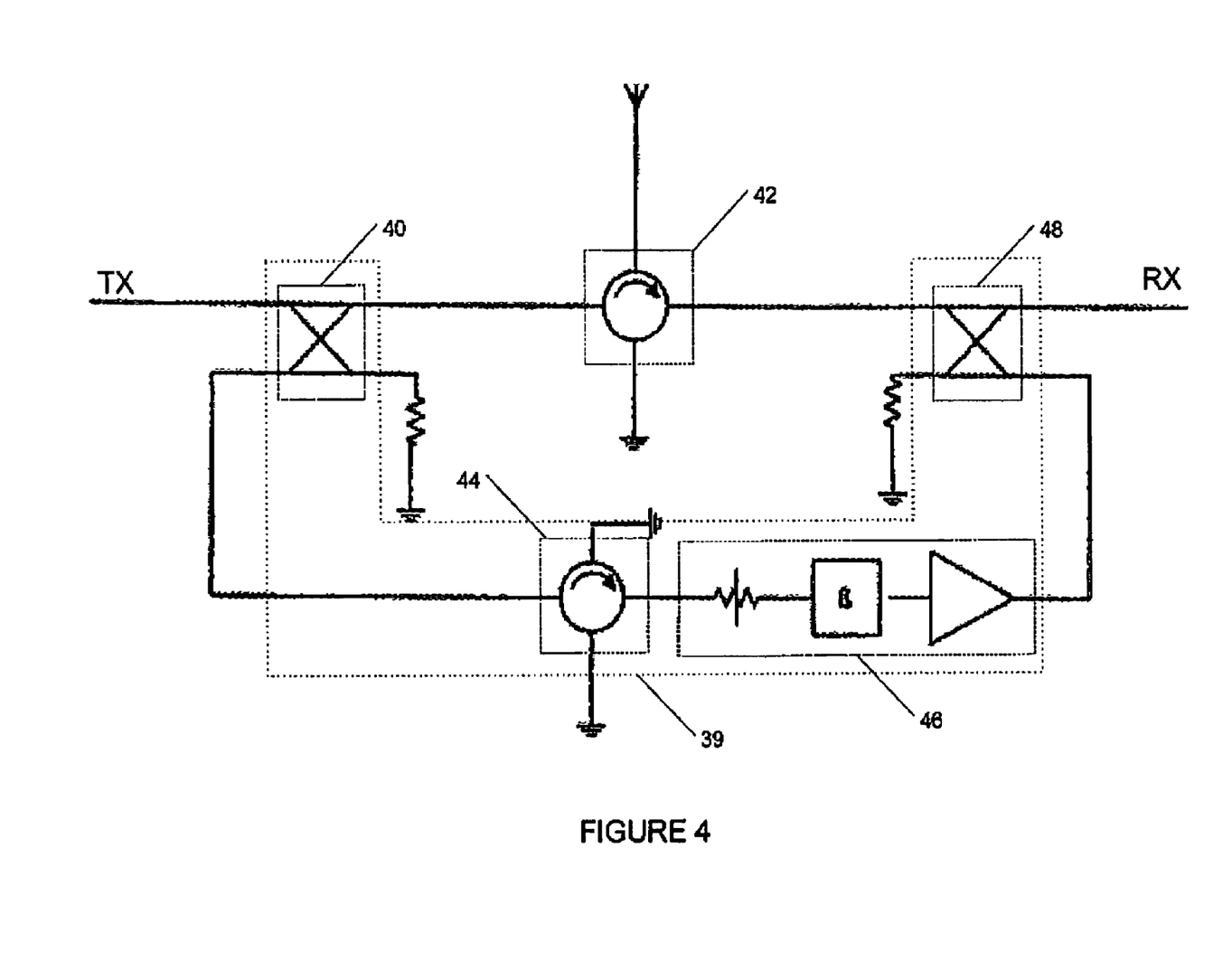
FIG. 4 is an electrical schematic which shows a signal cancellation loop added to a circulator-based duplexer to improve TX-RX isolation according to a second embodiment of the invention.

Now referring to FIG. 4, there is shown a balanced cancellation loop 39 according to a second embodiment of the invention. The balanced cancellation loop 39 is used for canceling the signal leaking from a transmitter to a receiver. The transmitter is connected to the receiver and the antenna using a circulator-based duplexer 42.

The balanced cancellation loop 39 comprises a first coupler 40, a circulator-based duplexer 44, an active unit 46 and a second coupler 48.

The active unit 46 comprises a variable attenuator, a variable phase shifter and an amplifier.

Figure 5:
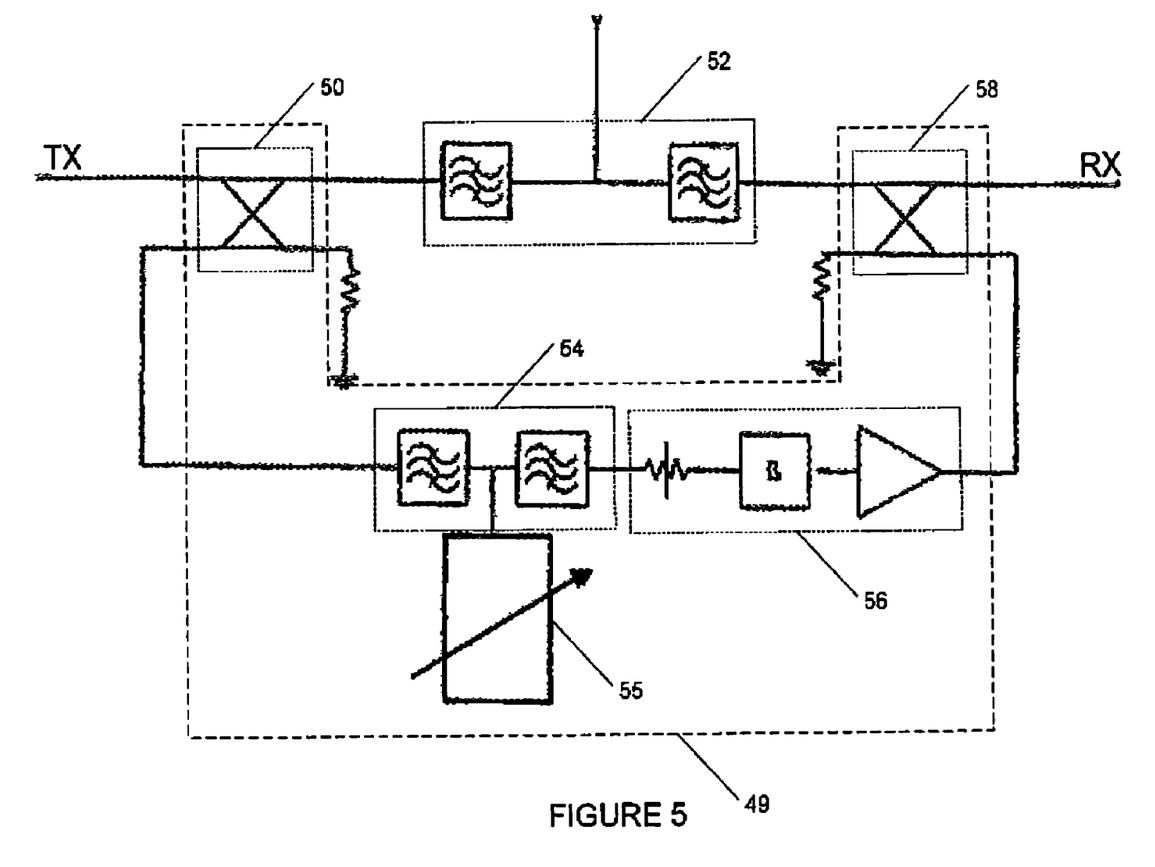
FIG. 5 is an electrical schematic which shows a signal cancellation loop added to a filter-based duplexer to improve TX-RX isolation according to a third embodiment of the invention.

Now referring to FIG. 5, there is shown a balanced cancellation loop 49 according to a third embodiment of the invention. The balanced cancellation loop 49 is used for canceling the signal leaking from a transmitter to a receiver. The transmitter is connected to the receiver and the antenna using a filter-based duplexer 52.

The balanced cancellation loop 49 comprises a first coupler 50, a filter-based duplexer 54, an active unit 56 and a second coupler 58. The filter-based duplexer 54 is further connected to an impedance tuner 55. The impedance tuner 55 simulates the behavior of the antenna to which the filter-based duplexer 52 is connected. Having the impedance tuner 55 enables to address the problem raised when the antenna is not properly impedance matched.

The active unit 56 comprises a variable attenuator, a variable phase shifter and an amplifier.

Figure 6:
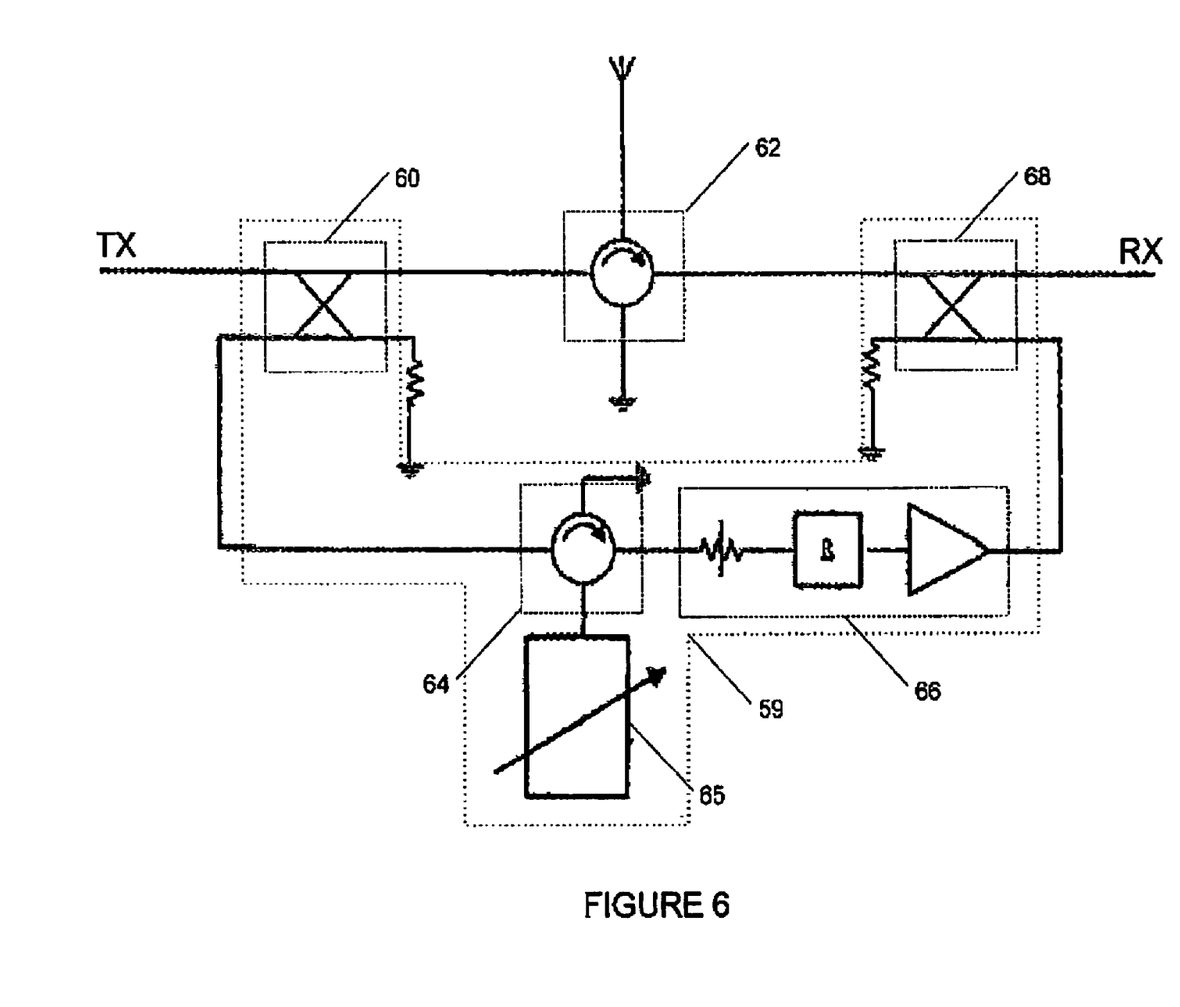
FIG. 6 is an electrical schematic which shows a signal cancellation loop added to a circulator-based duplexer to improve TX-RX isolation according to a fourth embodiment of the invention.

Now referring to FIG. 6, there is shown a balanced cancellation loop 59 according to a fourth embodiment of the invention. The balanced cancellation loop 59 is used for canceling the signal leaking from a transmitter to a receiver. The transmitter is connected to the receiver and the antenna using a circulator-based duplexer 62.

The balanced cancellation loop 59 comprises a first coupler 60, a circulator-based duplexer 64, an active unit 66 and a second coupler 68. The circulator-based duplexer 64 is further connected to an impedance tuner 65. The impedance tuner 65 simulates the behavior of the antenna to which the circulator-based duplexer 62 is connected.

The active unit 66 comprises a variable attenuator, a variable phase shifter and an amplifier.

Figure 7:
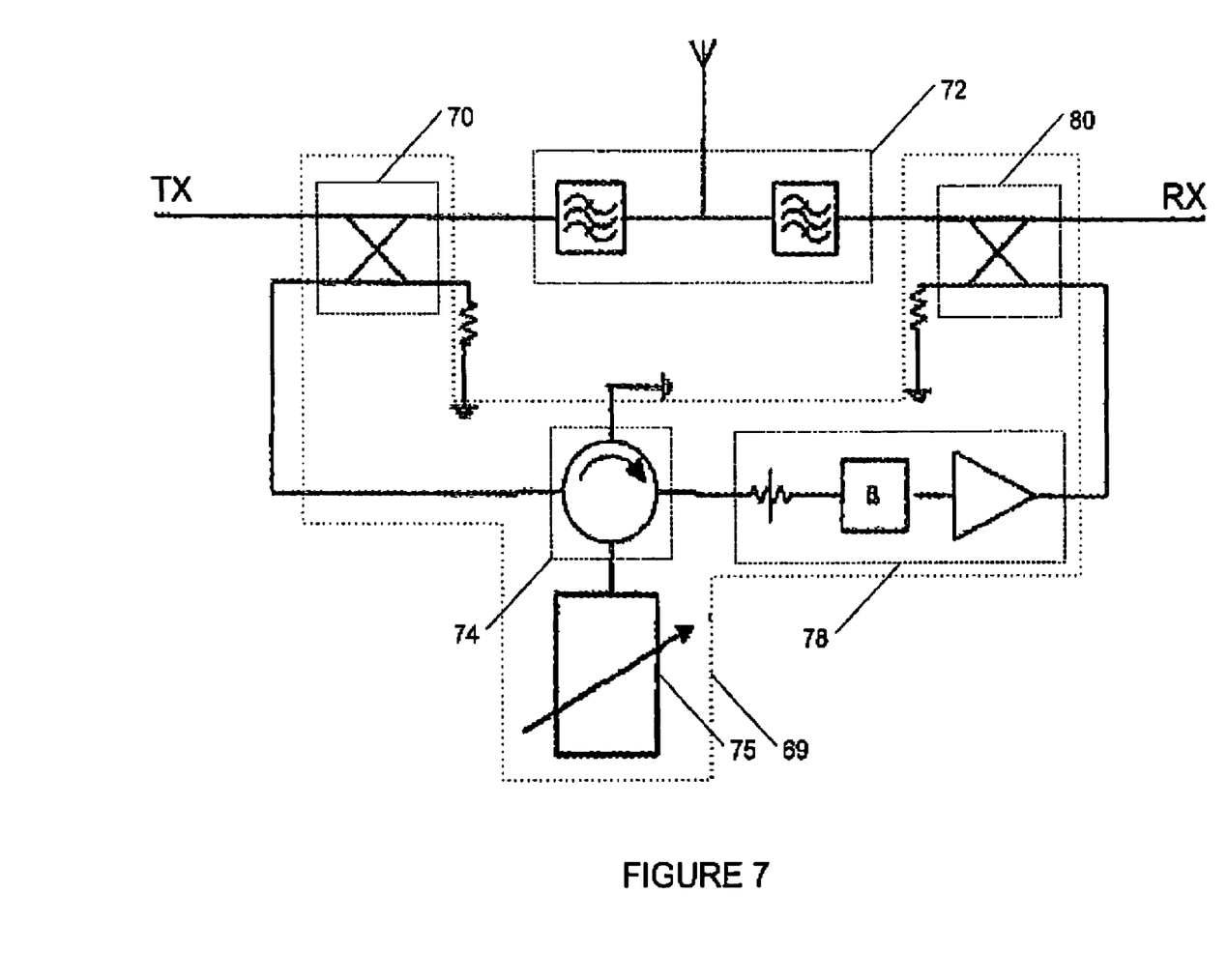
FIG. 7 is an electrical schematic which shows a signal cancellation loop added to a filter-based duplexer to improve TX-RX isolation according to a fifth embodiment of the invention.

Now referring to FIG. 7, there is shown a balanced cancellation loop 69 according to a fifth embodiment of the invention. The balanced cancellation loop 69 is used for canceling the signal leaking from a transmitter to a receiver. The transmitter is connected to the receiver and the antenna using a filter-based duplexer 72.

The balanced cancellation loop 69 comprises a first coupler 70, a circulator-based duplexer 74, an active unit 78 and a second coupler 80. The circulator-based duplexer 74 is further connected to an impedance tuner 75. The impedance tuner 75 simulates the behavior of the antenna to which the filter-based duplexer 72 is connected.

The active unit 78 comprises a variable attenuator, a variable phase shifter and an amplifier.

Figure 8:
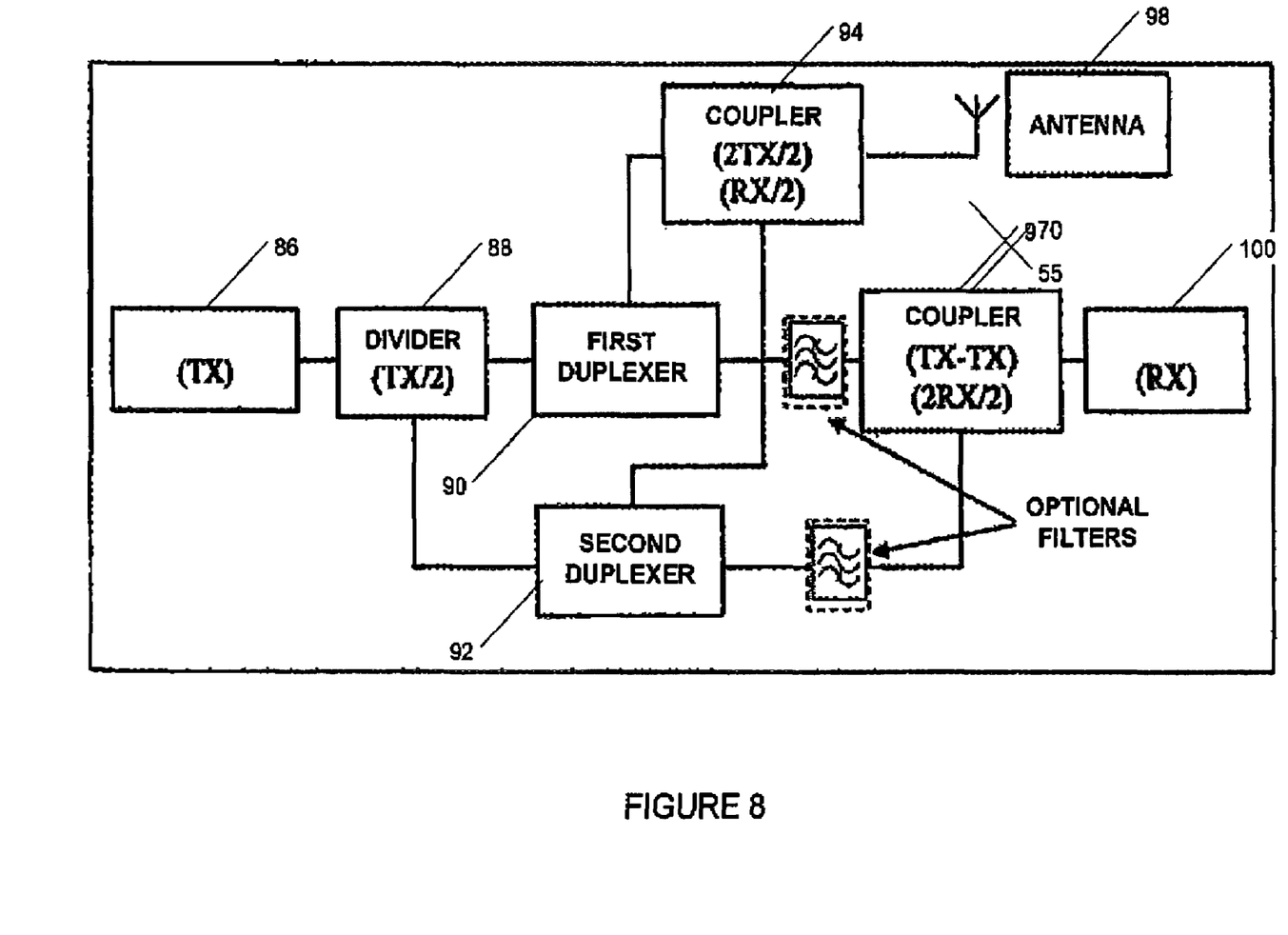
FIG. 8 is a block diagram which shows a signal cancellation architecture used with filter-based or circulator based duplexers to improve TX-RX isolation according to a sixth embodiment of the invention.
Figure 9A:
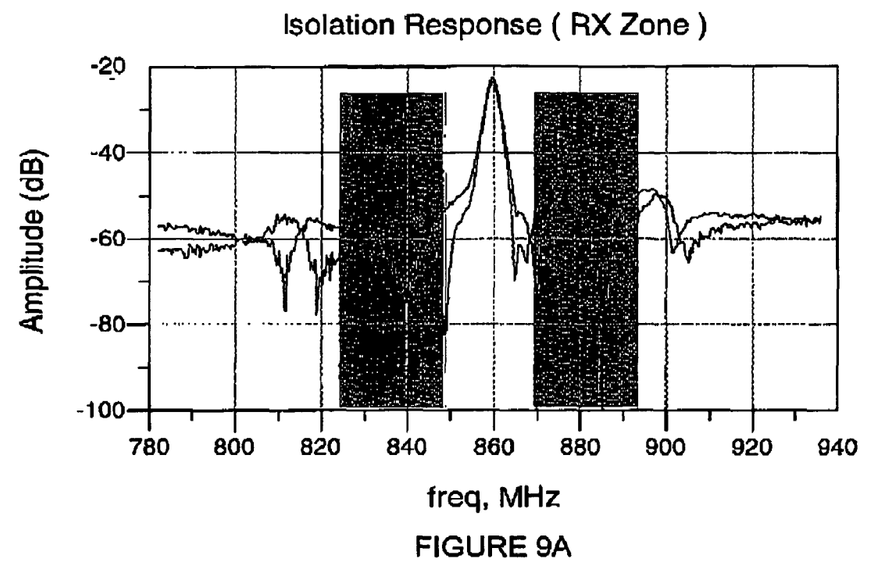
FIG. 9a is a graph which shows the level TX-RX isolation improvement that can be obtained using prior art on a real circuit having a commercial part as the filter-based duplexer. This figure shows the improvement when the cancellation loop controls are optimized to minimize the noise of the transmitter in the receiver's band. It also shows the limited bandwidth over which improvement can be made. The grey areas in this figure identify the transmit and receive bandwidths considering cellular telephony frequencies.
Figure 9B:
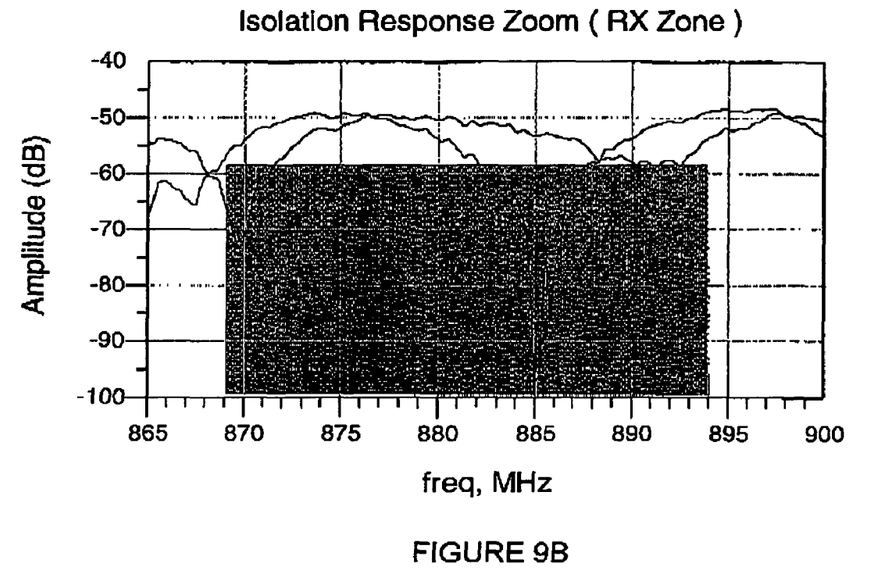
FIG. 9b is a graph which shows the same results as those of FIG. 9a in a zoomed-in view on the RX bandwidth. The grey areas in this figure identify the transmit and receive bandwidths considering cellular telephony frequencies.
Figure 10A:
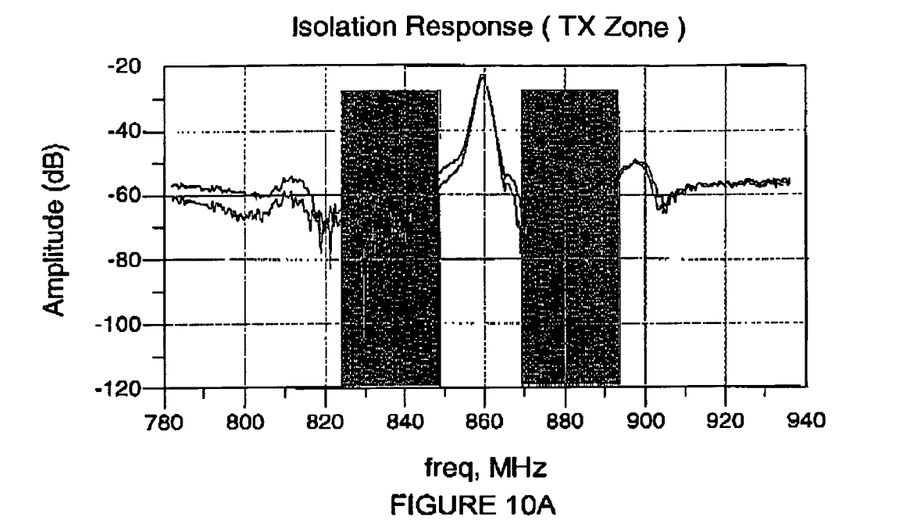
FIG. 10a is a graph which shows the level of TX-RX isolation improvement that can be obtained using prior art. This figure shows the improvement when the cancellation loop controls are optimized to minimize the noise of the transmitter in the its own band. It also shows the limited bandwidth over which improvement can be made. The grey areas in this figure identify the transmit and receive bandwidths considering cellular telephony frequencies.
Figure 10B:
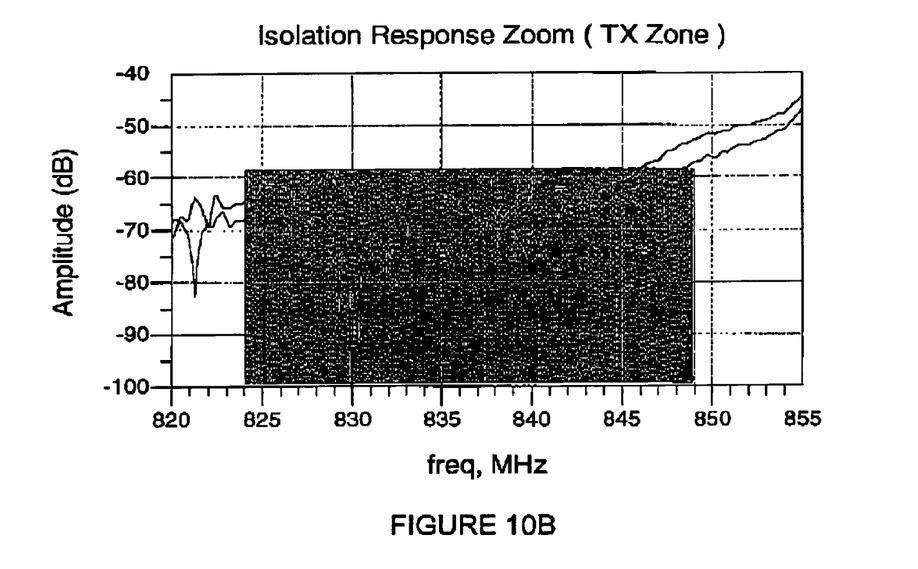
FIG. 10b is a graph which shows the same results as those of FIG. 10a in a zoomed-in view on the TX bandwidth. The grey areas in this figure identify the transmit and receive bandwidths considering cellular telephony frequencies.
Figure 11A:
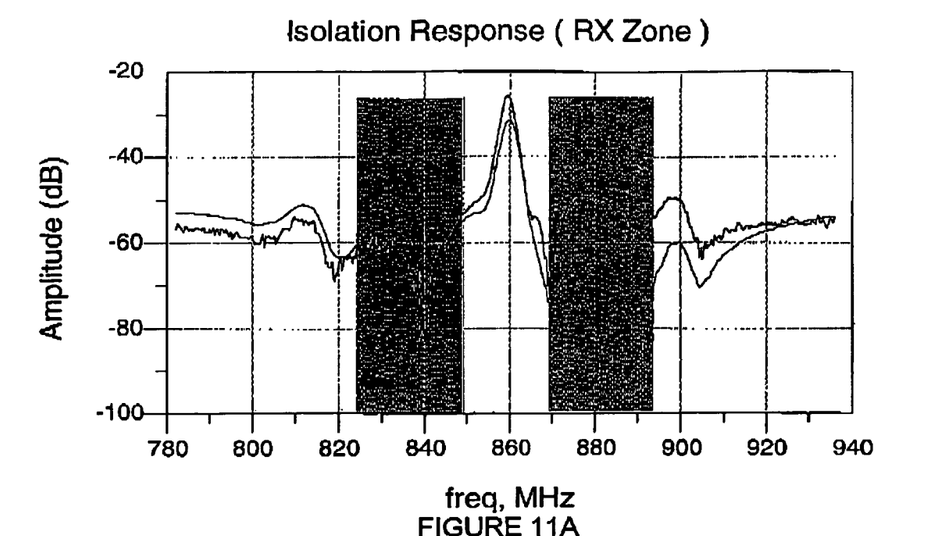
FIG. 11a is a graph which shows the level TX-RX isolation improvement that can be obtained using a circuit that implements the first embodiment of the invention. This figure shows the improvement when the cancellation loop controls are optimized to minimize the noise of the transmitter in the receiver's band. It also shows the wide bandwidth over which improvement can be made. The grey areas in this figure identify the transmit and receive bandwidths considering cellular telephony frequencies.
Figure 11B:
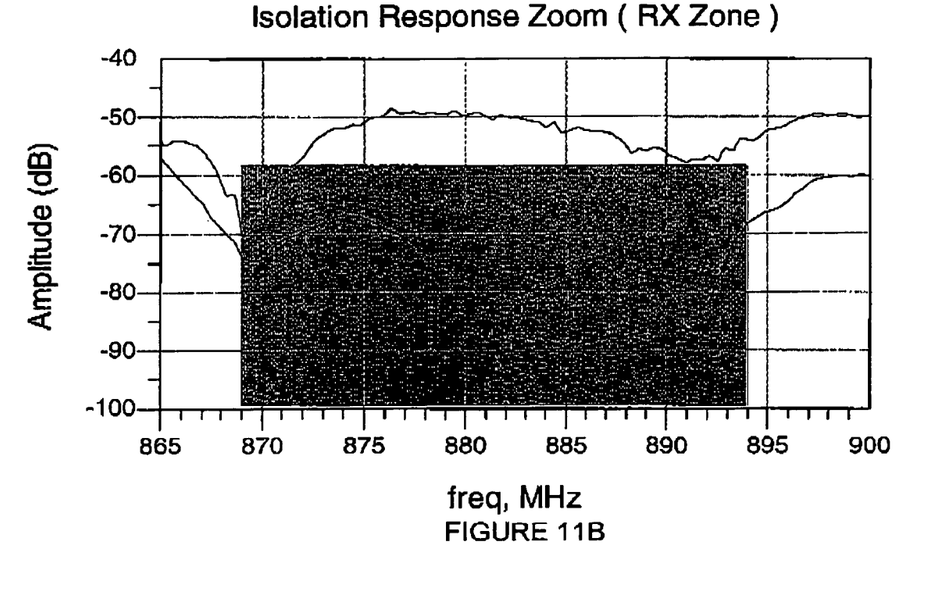
FIG. 11b is a graph which shows the same results as those of FIG. 11a in a zoomed-in view on the X bandwidth. The grey areas in this figure identify the transmit and receive bandwidths considering cellular telephony frequencies.
Figure 12A:
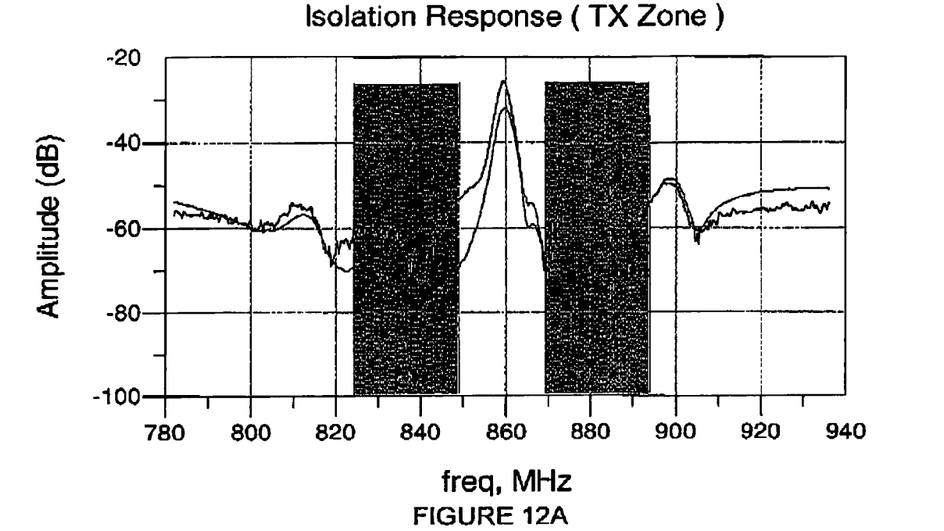
FIG. 12a is a graph which shows the level TX-RX isolation improvement that can be obtained using a circuit that implements the first embodiment of the invention. This figure shows the improvement when the cancellation loop controls are optimized to minimize the noise of the transmitter in its own band. It also shows the wide bandwidth over which improvement can be made. The grey areas in this figure identify the transmit and receive bandwidths considering cellular telephony frequencies.
Figure 12B:
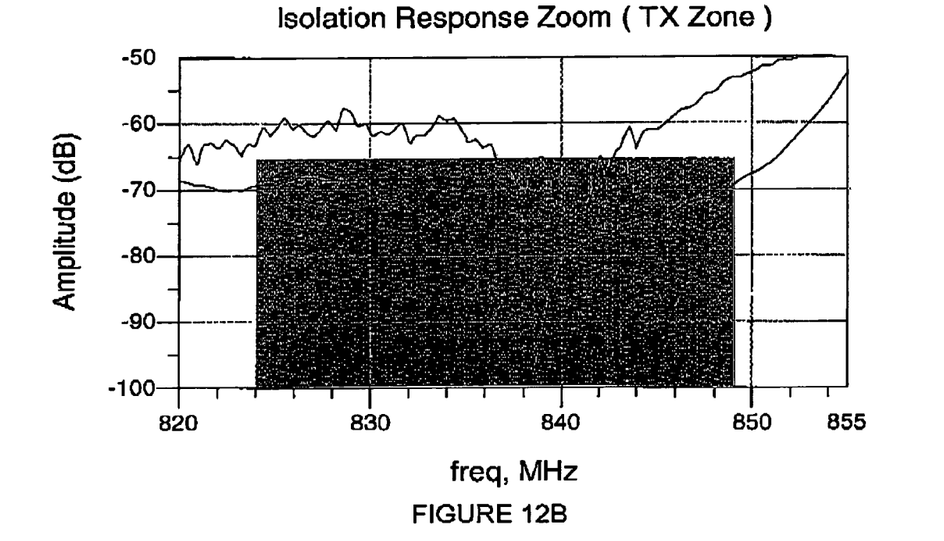
FIG. 12b is a graph which shows the same results as those of FIG. 12a in a zoomed-in view on the TX bandwidth. The grey areas in this figure identify the transmit and receive bandwidths considering cellular telephony frequencies.
Figure 13A:
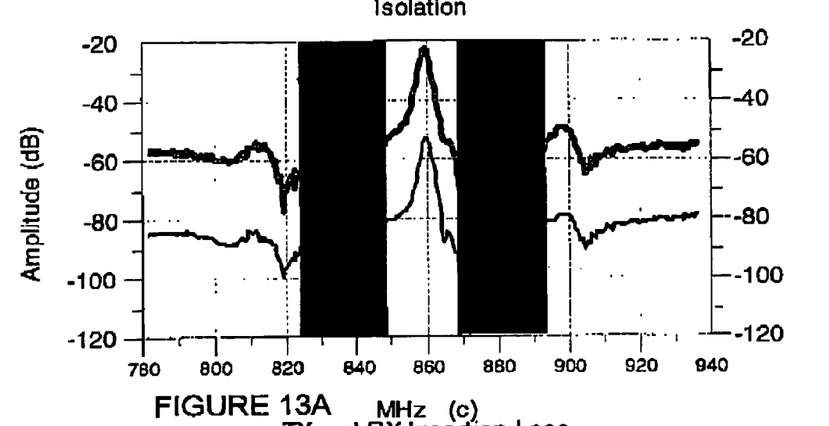
FIGS. 13a, 13b and 13c are graphs which show the level of TX-RX isolation improvement that can be obtained by using a circuit that implements the sixth embodiment of the invention. These figures show that the improvement is achieved for the TX and RX bands simultaneously without any adjusted controls.
Figure 13B:
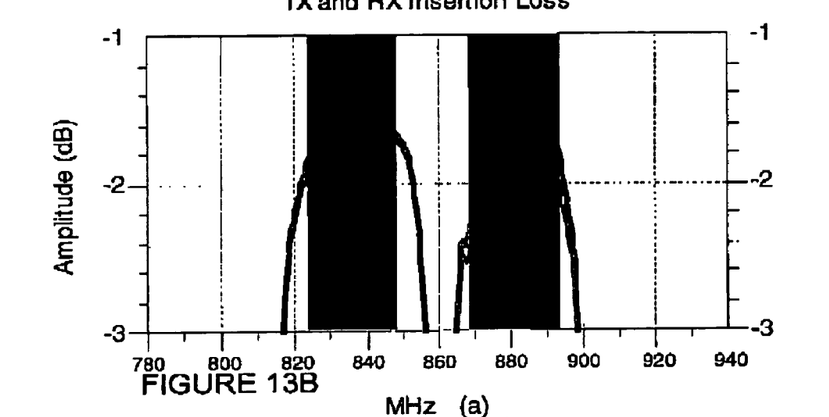
Figure 13C:
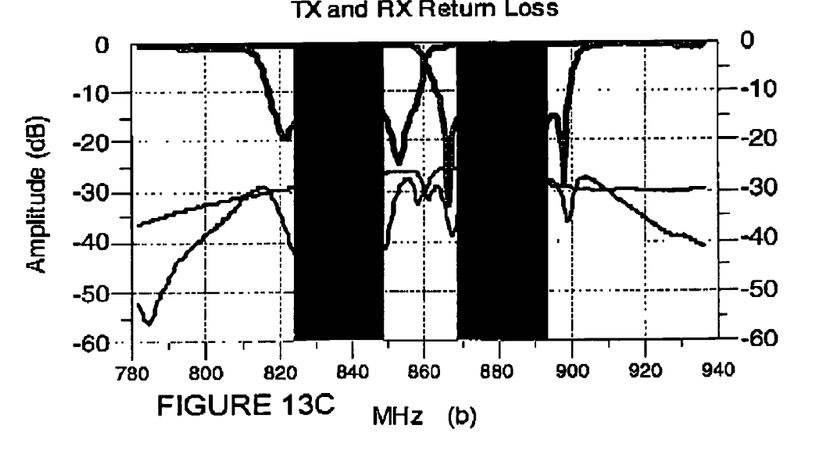

Referring to FIG. 8, there is shown another embodiment of a balanced duplexer.

In this embodiment, a signal to transmit is generated by the transmitter 86. The generated signal is then received by a divider 88. The divider 88 is a 90° hybrid couplers that divides by 2 an incoming signal. It will be appreciated that one of the divided signal outputted by the divider 88 is further shifted in phase by an amount of 90 degrees with respect to the other divided signal.

One of the divided signals outputted by the divider 88 is provided to a first duplexer 90 while the other divided signal outputted by the divider 88 is provided to a second duplexer 92. It will be appreciated that the first duplexer 90 and the second duplexer 92 are preferably the same. It will be appreciated that optional filters may be provided after the duplexers 90 and 92 as well as before 88 and after 96.

A first combiner/divider 94 is another 90° hybrid coupler, which is used to combine, i.e. adds, the signals outputted by both duplexers 90 and 92 to be fed to the antenna 98.

A second combiner 96, a third 90° hybrid coupler, also receives signals provided by the first and the second duplexers 90 and 92. The second combiner 96 is adapted to subtract both signals canceling any leaking signal.

In the case of a signal received by the antenna 98, the 90° hybrid coupler 94 separates the received signal into two signals, one of which is provided to the first duplexer 90 while the other is provided to the second duplexer 92. It will be appreciated that one of the divided received signal outputted by the hybrid coupler 94 is phased shifted an amount of 90 degrees with respect to the other divided signal. The combiner 96 then adds both signals outputted by the first duplexer 90 and the second duplexer 92 and feeds the summed received signal to the receiver.

It will be appreciated that in the case where both duplexers are circulator-based duplexers, it is possible to add filters in order to enhance performance.

It will be appreciated that using hybrid couplers leads to improved impedance matching at the three ports (TX, RX and ANT). It will be further appreciated by those skilled in the field that the use of the hybrid coupler in the transmitter path (88) coupled with the use of a dummy load at its forth port can replace the use of an isolator component at the output of the transmitter to protect the transmitter's power amplifier, thus resulting in dual function (isolator/duplexer) and system cost savings.

It will be appreciated that the topology of the present embodiment of the invention enables that desired signals are summed, i.e. added constructively, while undesired leakage signals are subtracted, i.e. added destructively, without the need for any control elements. This topology also insures virtually no degradation on insertion loss in transmitter to antenna and antenna to receiver paths.

While illustrated in the block diagrams as groups of discrete components communicating with each other via distinct data signal connections, it will be understood by those skilled in the art that the preferred embodiments are provided by a combination of hardware and software components, with some components being implemented by a given function or operation of a hardware or software system, and many of the data paths illustrated being implemented by data communication within a computer application or operating system. The structure illustrated is thus provided for efficiency of teaching the present preferred embodiment.

It should be noted that the present invention can be carried out as a method, can be embodied in a system, a computer readable medium or an electrical or electro-magnetical signal.

Although the above description relates to a specific preferred embodiment as presently contemplated by the inventors, it will be understood that the invention in its broad aspect includes mechanical and functional equivalents of the elements described herein.

We claim:

1. A circuit for improving isolation between a transmitter and a receiver, said circuit comprising:

a first branch between the transmitter and the receiver, the first branch having a main duplexer with a port operatively connected to an antenna and adapted to generate a first duplexer signal, a first hybrid coupler with a 90° phase shift between signals operatively connected to an input of the main duplexer and an output of the transmitter for receiving a signal from the transmitter and producing two signals therefrom, and a second hybrid coupler with a 90° phase shift between signals operatively connected to an output of the main duplexer and an input of the receiver for receiving the first duplexer signal and a second duplexer signal and combining them into a single corrected signal, the single corrected signal to be injected into the receiver;

a second branch between the first hybrid coupler and the second hybrid coupler, the second branch comprising a cancellation duplexer having characteristics similar to the main duplexer and receiving one of the two signals, and the cancellation duplexer adapted to generate the second duplexer signal and transmit the second duplexer signal to the second coupler such that it be combined with the first duplexer signal to form the corrected signal; and a third hybrid coupler with a 90° phase shift between signals connected to a port of the antenna, to a port of the main duplexer, and to a port of the canceling duplexer.

2. The circuit as claimed in claim 1, wherein said cancellation duplexer comprises a filter-based duplexer.

3. The circuit as claimed in claim 2, further comprising an impedance tuner operatively connected to the filter-based duplexer.

4. The circuit as claimed in claim 1, wherein said cancellation duplexer comprises a circulator-based duplexer.

5. The circuit as claimed in claim 4, further comprising an impedance tuner operatively connected to the circulator-based duplexer.

6. The circuit as claimed in claim 1, wherein the first coupler is a hybrid coupler providing two equally divided signals, one divided signal being phase shifted by 90° relative to another divided signal, and the second coupler is a hybrid coupler that combines two input signals by phase shifting one of the two input signals by 90° relative to another input signal.

7. The circuit as claimed in claim 1, wherein a first filter is placed between the main duplexer and a combiner, and a second filter similar to the first filter is placed between the canceling duplexer and the combiner.

8. The circuit as claimed in claim 1, wherein the main and canceling duplexers are similar filter-based duplexers.

9. The circuit as claimed in claim 1, wherein the main and canceling duplexers are similar circulator-based duplexers.

* * * * *